United States Patent
Kelley

(10) Patent No.: US 6,811,734 B2
(45) Date of Patent: Nov. 2, 2004

(54) PROCESS OF MAKING DECORATIVE FOOTBEDS FOR FOOTWEAR

(75) Inventor: Thomas Jeffrey Kelley, San Diego, CA (US)

(73) Assignee: Sanuk U.S.A. LLC, Cardiff by the Sea, CA (US)

(*) Notice: Subject to any disclaimer, the term of this patent is extended or adjusted under 35 U.S.C. 154(b) by 0 days.

(21) Appl. No.: 10/292,218

(22) Filed: Nov. 11, 2002

(65) Prior Publication Data

US 2004/0088889 A1 May 13, 2004

(51) Int. Cl.[7] .............................................. B29C 65/02
(52) U.S. Cl. ........................ 264/160; 264/163; 264/247; 264/248
(58) Field of Search ................................. 264/160, 163, 264/247, 243, 248, 249

(56) References Cited

U.S. PATENT DOCUMENTS

| | | | |
|---|---|---|---|
| 2,284,947 A | | 6/1942 | Clifford .......................... 36/44 |
| 2,425,388 A | * | 8/1947 | Oestricher ................... 156/515 |
| 2,917,842 A | * | 12/1959 | Scholl .......................... 36/178 |
| 3,418,732 A | * | 12/1968 | Marshack ........................ 36/44 |
| 3,555,709 A | * | 1/1971 | Raffaelli, Sr. ................... 36/44 |
| 3,899,798 A | * | 8/1975 | Kihara ....................... 12/146 B |
| 4,270,966 A | * | 6/1981 | Kihara ........................ 156/251 |
| D336,977 S | | 7/1993 | Sensi .......................... D2/961 |
| 5,930,916 A | * | 8/1999 | Connor ......................... 36/11.5 |
| 6,003,246 A | | 12/1999 | Pan .............................. 36/11.5 |
| 6,014,821 A | * | 1/2000 | Yaw .............................. 36/8.1 |
| 6,029,372 A | | 2/2000 | Pan .............................. 36/11.5 |
| D429,555 S | | 8/2000 | Kelley ......................... D2/961 |
| 6,684,442 B1 | * | 2/2004 | Parker et al. ............. 12/146 B |
| 6,735,885 B2 | * | 5/2004 | Yaw .............................. 36/11.5 |

FOREIGN PATENT DOCUMENTS

KR  2001000538 A  *  1/2001

* cited by examiner

Primary Examiner—Edmund H. Lee
(74) Attorney, Agent, or Firm—Greer, Burns & Crain, Ltd.

(57) ABSTRACT

Footbeds for footwear, especially sandals, are formed from weldable plastic materials, such as industrial and commercial carpeting, and are provided with patterns welded into the material and with decorative prints or patterns welded to the physical patterns. The footbeds are very decorative in appearance and produce very saleable footwear products. A process for conveniently and economically producing the decorative footbeds is also disclosed.

9 Claims, 2 Drawing Sheets

Step A

Step B

Step C

Step D

Product

PROCESS OF MAKING DECORATIVE FOOTBEDS FOR FOOTWEAR

FIELD OF THE INVENTION

The present invention relates to footbeds for footwear, especially decorative footbeds for open style footwear, such as sandals and the like, and a process of making the same.

BACKGROUND OF THE INVENTION

It has become popular to provide sandals and similar open style footwear with decorative footbeds to enhance their appearance both on and off the foot. Recently, industrial carpeting has been adopted as a sturdy, long wearing footbed material which, when employed in the unlikely environment of open style footwear, imparts an unusual and esthetically pleasing visual quality to the footwear, as well as foot comfort. Among materials that have been employed are artificial grass and similar carpeting materials.

U.S. Pat. Nos. 6,029,372 and DES. 429,555, for example, utilize as a footbed an industrial carpeting material comprised of filaments of polyvinyl chloride intertwined to form a cushioning, breathable network body that is very attractive and comfortable and that stands up to the abusive service to which sandals and beach footwear are subjected.

SUMMARY OF THE INVENTION

It is an object of the present invention to provide footwear footbeds incorporating a variety of decorative enhancements.

It is an additional object of the invention to provide footwear footbeds made of industrial carpeting and/or like products and including a variety of esthetic design elements comprised of one or more of shape, form, color and/or decorative print.

More particularly, it is an object of the invention to provide decorative footbeds for footwear comprised of a body of weldable plastic material, a preselected pattern physically welded into the footbed material, and a decorative print or pattern welded to the physical pattern.

In accordance with the invention, a material is selected that is suitable for use as a footbed and comprised of a body of weldable filaments or fibers having a given decorative appearance; a pattern is physically welded into the weldable filaments or fibers to form a physical pattern therein or thereon; and a decorative print or pattern is welded to the physical pattern to impart thereto an appearance the same as, complementary to or contrasting with the appearance of the body of filaments or fibers. Additionally, the body of filaments or fibers may include a base or backing, which may also have a given decorative appearance, e.g., similar to, complementary to or contrasting with the appearance of the body of filaments or fibers, the physical pattern welded therein or thereon and/or the decorative print or pattern welded thereto.

Further in accordance with the invention, a process is provided for conveniently producing decorative footbeds that is comprised of the steps of selecting a sheet of weldable plastic material suitable for use as a footbed material, placing a transfer sheet bearing a decorative transfer print or pattern onto the sheet of weldable plastic material, subjecting the sheet of weldable plastic material and the transfer sheet to plastic welding energy in a preselected physical pattern, and causing the physical pattern to be welded into the weldable plastic material and the decorative transfer print or pattern to be transferred to and welded to the weldable plastic material.

The process is simple and economical to practice and produces decorative footbeds that are novel, unusual and highly attractive.

These and other objects and advantages of the invention will become apparent to those reasonably skilled in the art from the following detailed description, as taken in conjunction with the accompanying drawings.

DETAILED DESCRIPTION OF PREFERRED EMBODIMENTS

The following is a detailed description of certain embodiments of the invention presently deemed by the inventor to be the best mode of carrying out his invention.

Figure 1:
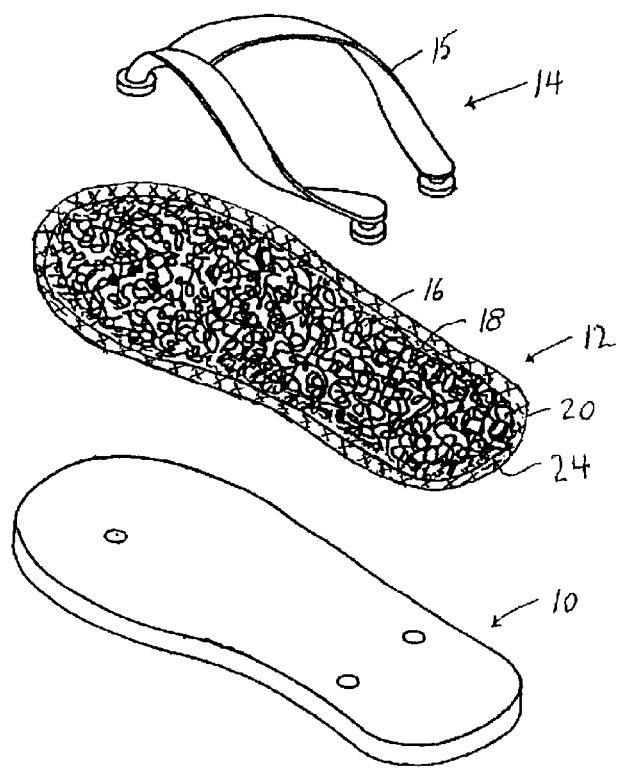
FIG. 1 is an exploded perspective view of the three customary components of open style footwear such as sandals, and illustrating a first embodiment of the footbed of the invention.

Referring to FIG. 1, the customary components of a sandal comprise a sole 10, a footbed 12 to be affixed to the sole, and means 14 to be affixed to the footbed and sole for holding the footbed and sole on the plantar surface or sole of a wearer's foot. The means 14 may comprise any customary open footwear upper, such as one or more sandals straps, or a slide, or the illustrated thong 15.

The footbed 12 illustrated in FIG. 1 (see also FIG. 4) constitutes one embodiment of the present invention and comprises, in its preferred form, a base or backing 16 and a layer or body 18 of weldable plastic material secured to the base or backing 16. The base or backing 16 is optional and may be included in or excluded from the footbed; however, it is included in the preferred embodiments as it facilitates incorporation into the footbed of additional decorative and/or ornamental design elements. In accordance with the invention, portions of the body 18, whether with or without a backing 16, are compressed and welded together to form a physical pattern 20 in or on the body. In FIG. 1, the physical pattern is in the form of a marginal welded edge on the footbed.

Figure 2:
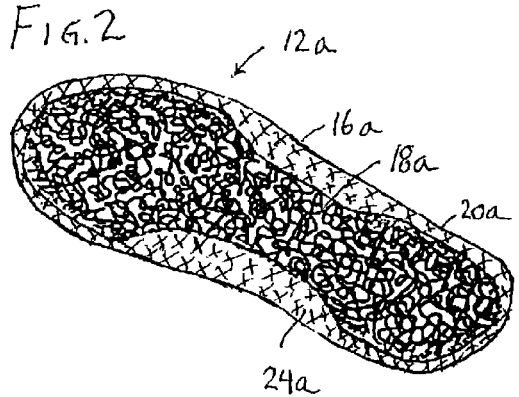
FIG. 2 is a perspective view of a second embodiment of the footbed of the invention.

In the embodiment of the footbed illustrated in FIG. 2, which is comprised of the same elements as FIG. 1 numbered by the same numbers with the suffix "a", the physical pattern 20a is such that the unwelded portions of the body 18 conform more or less to an imprint made by the plantar surface or sole of a wearer's foot.

Figure 3:
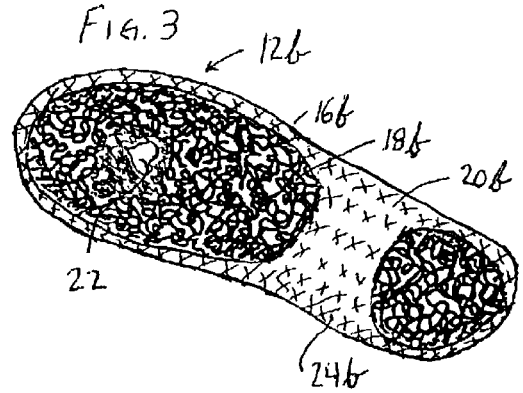
FIG. 3 is a perspective view of a third embodiment of the footbed of the invention.

In the embodiment of the footbed illustrated in FIG. 3, wherein the same elements are indicated by the same numerals with the suffix "b", the physical pattern 20b is such that the unwelded portions of the body 18 conform more or less to an imprint made by the toe, ball and heel of the plantar surface or sole of a wearer's foot.

Additionally or alternatively, the welded physical pattern may comprise a decorative shape welded into the body 18 at one or more selected locations, such for example, as the heart 22 welded in the ball portion of the footbed depicted in FIG. 3.

Further in accordance with the invention, the physical pattern welded into the footbed body 18 is enhanced by a decorative surface pattern 24, such as a floral, paisley, plaid, rep-stripe, mountain, seashore, athletic or other decorative or theme pattern. For the sake of clarity, the decorative surface patterns 24 have been indicated simply by the letters x in the illustrations of FIGS. 1, 2, and 3. In the actual end products the areas marked with x's bear decorative ornamental designs or patterns.

The material used for the footbed 12 may comprise any material suitable for the purpose and comprised of a body 18 of weldable plastic, or weldable fibers, or other fixably compressible material. One material preferred for practice of the invention, which is depicted schematically in the drawings, has a body 18 comprised of filaments of polyvinyl chloride of substantially uniform diameter that are intertwined to form a cushioning, breathable network body having thickness and a plurality of open spaces. The filaments are readily weldable to facilitate formation of a desired physical pattern 20 within the body 18.

The decorative pattern is preferably applied onto the physical pattern by image transfer techniques, i.e., by transfer from an image bearing transfer sheet to the footbed material, preferably under heat and pressure, simultaneously with the welding of the physical pattern into the body of the footbed.

The result is an extremely attractive footbed which, when incorporated in open style footwear such as sandals, produces a very attractive and very saleable footwear product.

Additional decorative or ornamental aspects or features can be achieved by utilizing an open weave body 18 having a given decorative appearance, e.g., color, a base 16, visible through the open weave body 18 and having a decorative appearance the same as, complementary to or contrasting with that of the body, and a decorative pattern having an appearance similar or complementary to or contrasting with the appearance of one or the other or both of the base 16 and the body 18.

Figure 4:
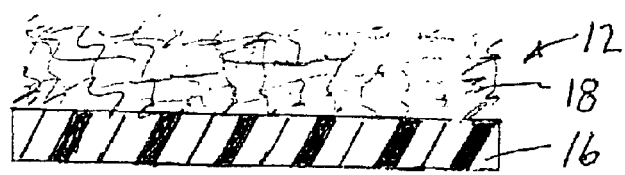
FIG. 4 is a schematic illustration of the sequence of steps involved in practice of the process of the invention.
Figure 4:
Figure 4:
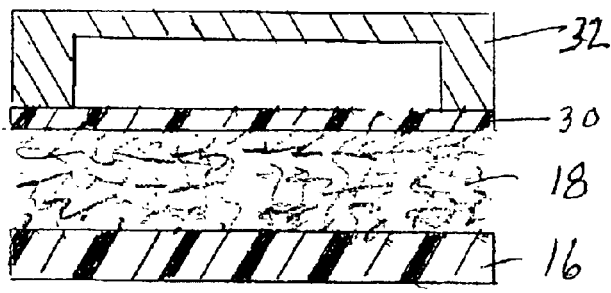
Figure 4:
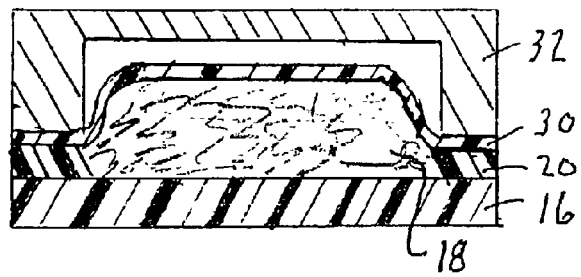
Figure 4:

The process of making the decorative footbed of the invention is comprised of a particular sequence of steps, which are illustrated schematically in FIG. 4. The first step resides in selecting an appropriate material for the footbed 12, preferably one having a base or backing 16 and a cushiony weldable or fixedly compressible body 18. The material may be supplied in sheet or continuous web form.

A sheet, film or web 30 of a transfer material having a transferable decorative image or pattern on its lower surface is laid over the body 18 of footbed material. The footbed and transfer materials are then moved to a mold or die 32 of a press (not shown) capable of applying plastic welding and image transferring energy to the footbed and transfer materials. A preferred type of press is a radio frequency press or high frequency plastic welding machine, such as available from Strayfield Ltd. and Radyne Co. U.K. The mold or die is then pressed against the transfer and footbed materials, and energized to impart the proper energy level to the mold or die.

The mold or die 32 is of a configuration to weld into the plastic body 18 the preselected physical pattern 20 and to cause the decorative pattern 24 to be transferred from the transfer sheet 30 onto the physical pattern and/or other portions of the body 18. The mold or die is then retracted, the transfer sheet stripped away and the footbed die cut to desired shape to produce a decorative footbed product as illustrated and as above described.

The steps of the process may be preformed stepwise on sheets of foot bed and transfer materials or may be preformed as a sequential continuous process on continuous webs of the footbed and transfer materials. In either case, the process is highly efficient and economical and produces practical and extremely attractive footbeds.

The objects and advantages of the invention have therefore been shown to be achieved in a practical, efficient, economical and facile manner.

While certain preferred embodiments of the invention have been herein illustrated and described, it is to be appreciated that various modifications, rearrangements and changes made be made therein without departing from the scope of the invention, as defined by the appended claims.

What is claimed is:

1. A process of making a decorative footbed for footwear comprising the steps of providing a sheet of weldable plastic footbed material, placing a transfer sheet having a decorative transfer pattern thereon onto the sheet of footbed material, subjecting the sheet of footbed material and the transfer sheet to plastic welding energy in a preselected pattern, causing the preselected pattern to be welded into the footbed material and the decorative transfer pattern to be transferred to and welded onto the welded pattern, and stripping away the decorative transfer sheet from the welded pattern thereby producing the decorative footbed bearing the welded and decorative pattern.

2. The process of claim 1 including the steps of performing the steps of claim 1 seriatim on a continuous web of plastic footbed material and cutting the web into individual footbeds each bearing the welded and decorative patterns.

3. The process of claim 1 wherein the footbed material comprises a body of weldable fibers.

4. The process of claim 1 wherein the footbed material comprises an intertwined body of weldable plastic filaments.

5. The process of claim 1 wherein the footbed material comprises a base having a first decorative appearance and a mass of weldable fibers having a second decorative appearance on the base, the base being visible through the mass of fibers, and the decorative transfer pattern either complementing or contrasting with the footbed material.

6. The process of claim 1 wherein the footbed material comprises a base having a given decorative appearance and a body of weldable fibers on the base having the same, a complementary or a contrasting appearance with the base, and a decorative transfer pattern having an appearance the same as, complementary to or contrasting with the decorative appearance of one or the other or both of the base and the body of fibers.

7. The process of claim 1 wherein the welded decorative pattern comprises a marginal edging on the footbed.

8. The process of claim 1 wherein the decorative welded pattern comprises a marginal edging on the footbed and is so configured as to define footbed material in the shape of an image of the plantar surface of a foot.

9. The process of claim 1 wherein the welded decorative pattern comprises a marginal edging on the footbed and is so configured as to define footbed material in the shape of an image of the toe, ball and heel portions of the plantar surface of a foot.

* * * * *